May 13, 1930.  G. W. GILDERMAN  1,758,888
APPARATUS FOR MAKING CORES
Filed June 4, 1927   5 Sheets-Sheet 2

Fig. 2

Inventor
George W. Gilderman
Emery Bootle Janney & Varney
Attys

May 13, 1930.  G. W. GILDERMAN  1,758,888
APPARATUS FOR MAKING CORES
Filed June 4, 1927   5 Sheets-Sheet 4

Inventor:
George W. Gilderman
Emery, Booth, Janney & Varney
Attys.

May 13, 1930.  G. W. GILDERMAN  1,758,888
APPARATUS FOR MAKING CORES
Filed June 4, 1927    5 Sheets-Sheet 5

Inventor
George W. Gilderman

Patented May 13, 1930

1,758,888

UNITED STATES PATENT OFFICE

GEORGE W. GILDERMAN, OF MISHAWAKA, INDIANA, ASSIGNOR TO DODGE MANUFACTURING CORPORATION, OF MISHAWAKA, INDIANA, A CORPORATION OF DELAWARE

APPARATUS FOR MAKING CORES

Application filed June 4, 1927. Serial No. 196,473.

This invention relates to core making, and more particularly to apparatus therefor. Among other objects the invention aims to provide a practicable and reliable machine by which mold cores can be accurately made by separately forming and joining complemental sections thereof and depositing or withdrawing the completed cores, and by which an improved practice of core making may be conveniently carried out. The invention also contemplates the provision of suitable mechanical means for use in producing cores of a special character hereinafter described adapted for molds for casting hollow rollers or the like, including rollers with recessed or concave ends.

These and other objects will be more fully described and set forth in the following specification and shown in the accompanying drawings in which—

Like numerals refer to like elements throughout the drawings in which 10 indicates a base or platform having the split socket 11 in which is stepped or mounted the post 12, secured in proper position by the contraction of split socket 11.

On the upper end of the post or column 12 is the head 13, also split to permit clamping in adjusted positon. This head 13 is provided with a table portion 13$^a$ through which extends a plurality of studs or bolts 14 secured in adjusted position by the lock nuts 15. Extending upwardly from the table portion is a standard having on its upper end a horizontally disposed clamping sleeve 13$^b$, shown in Fig. 2, for example, the same being split as indicated at 13$^c$ and having its parts connected by clamp bolts. A fixed shaft 16 extends through said clamping sleeve and is secured in adjusted position by the contraction of the sleeve, as will be obvious.

Figure 1:
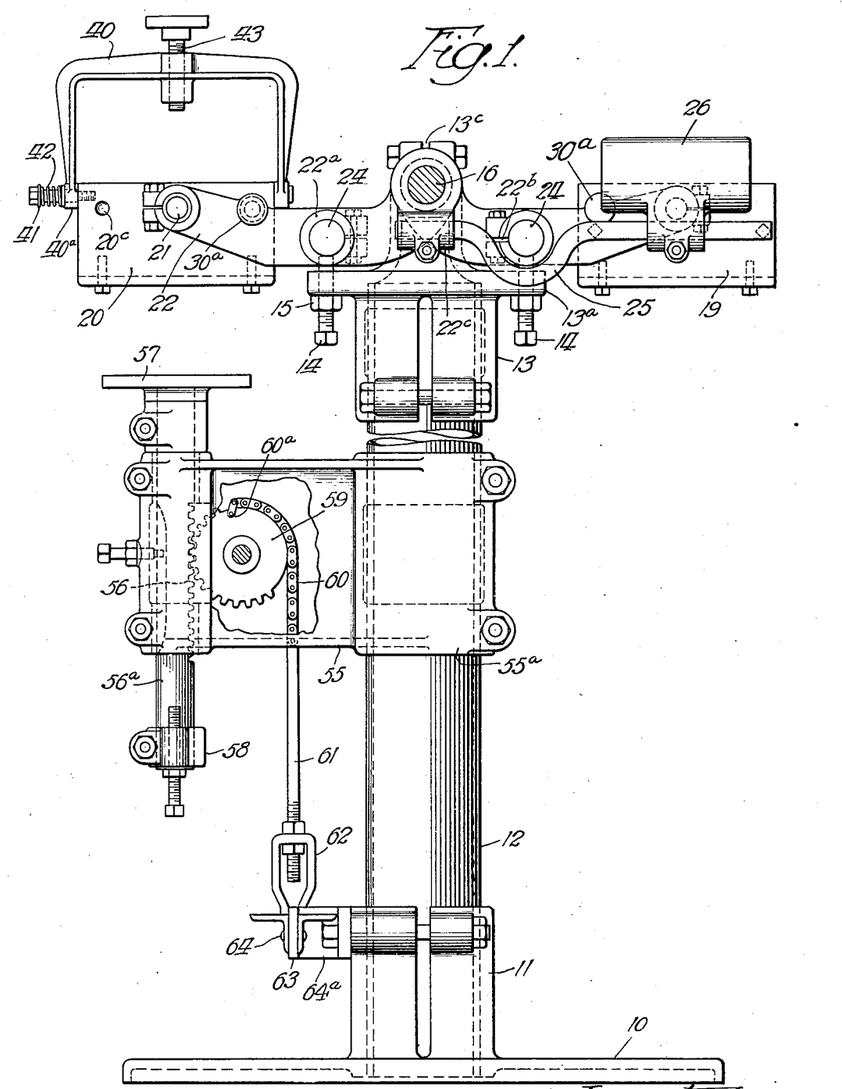
Fig. 1 is a side elevation of a machine embodying my invention, a portion thereof being broken away for illustration.
Figure 2:
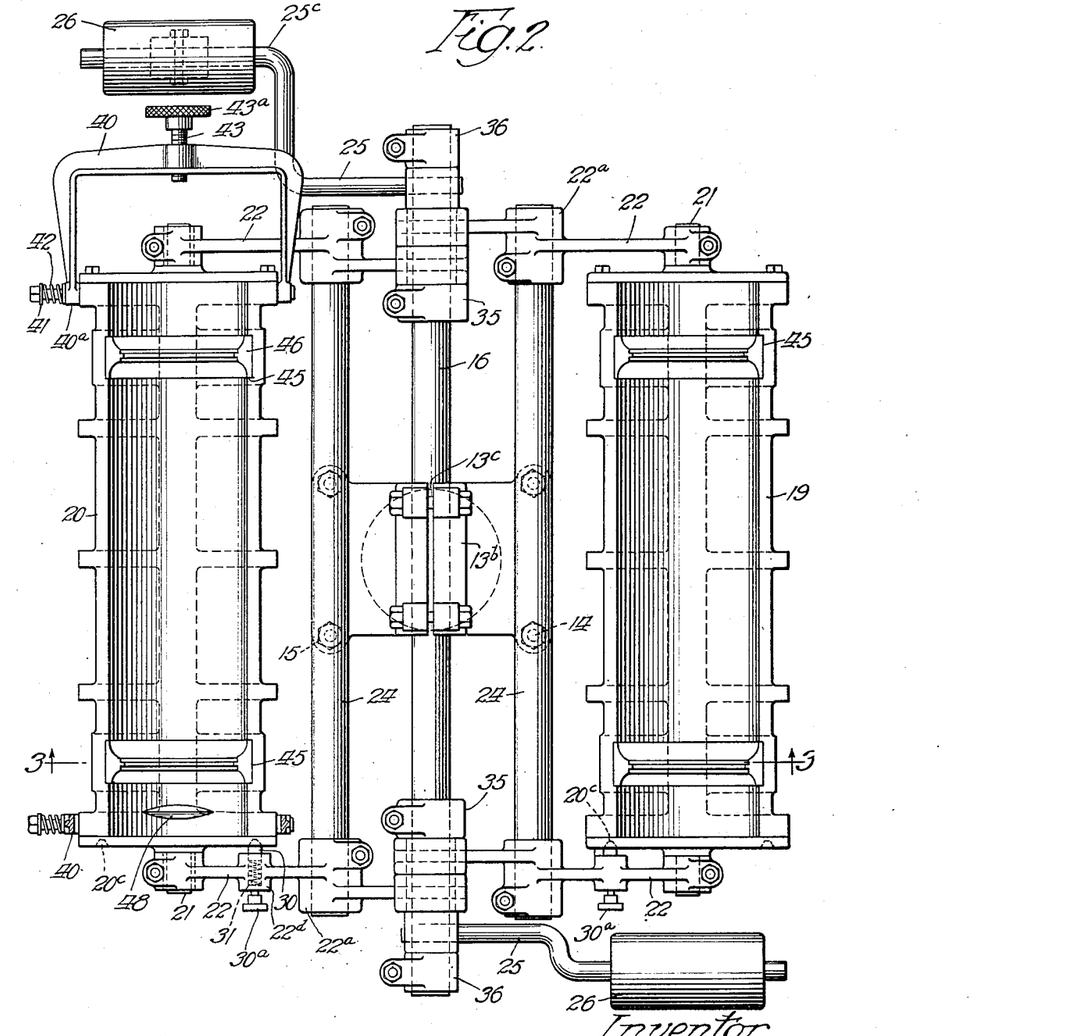
Fig. 2 is a plan view of the same showing the mold sections in spaced horizontal relation.

A pair of core boxes 19 and 20 are provided, generally similar in construction. Each of these boxes is provided with a trunnion 21 projecting from each end and these trunnions are journaled in the ends of arms 22, which are arranged with one pair for each of the core boxes 19 and 20, as illustrated in Fig. 2. A cross-shaft 24 extends between and through each pair of the arms, enlarged apertured portions 22$^a$ being provided for that purpose, the same being split as indicated in Fig. 1 at 22$^b$ for contraction to secure the shafts 24 in fixed, adjusted relation with respect to the arms.

Each of the arms 22 is rotatably journaled at its inner ends upon the fixed shaft 16 so that each pair of arms with its cross-shaft 24 may be rotated or swung as a unit about the shaft 16, carrying with it its box 19 or 20.

One of the carrying arms for each core box is provided at its inner end with a socket clamp 22$^c$ for attachment of one of the bars 25 carrying the adjustably mounted counterweights 26 for counterbalancing the boxes, each bar 25 being curved to accommodate and clear the cross-shaft 24 and the enlarged portion 22$^a$ of the arm 22 to permit removal or adjustment of the shaft 24, as will be apparent.

To lock the core boxes against rotation I provide on one of each pair of arms 22 a detent 30 extending through a suitable boss 22$^d$. A spring 31 mounted in the boss 22$^d$ normally extends the locking end of the detent 30, which is provided with the engaging cap or head 30$^a$ at its other end. At the end of each core box adjacent the detent 30 is provided a pair of apertures or sockets 20° in which the detent may seat, as indicated in Fig. 2. When the detent is withdrawn, the corresponding core box may be freely rotated about its trunnion 21, as will be apparent, to discharge its content or for other purposes. The detent normally will engage one of the sockets 20° to lock the box in molding or inverted position, as desired.

Split collars 35, 36, are secured on the shaft 16 at the inner and outer sides respectively of the inner ends of the arms 22 to secure the same in adjusted position on the shaft 16. This construction permits the accommodation of the same machine to different lengths of boxes, as will be apparent. the shafts 24 being adjustable with respect to the arms 22 also. It will be noted that one of the counterbalance rods 25 is horizontally off-set as indicated at 25° to permit swinging outwardly a bail hereinafter described.

The bolts or studs 14, it will be noted, underlie cross-shafts 24 and may be adjusted to support the shafts and thereby the arms 22 in horizontal position for molding and subsequent operations in such wise that the boxes will be properly leveled.

Figure 5:
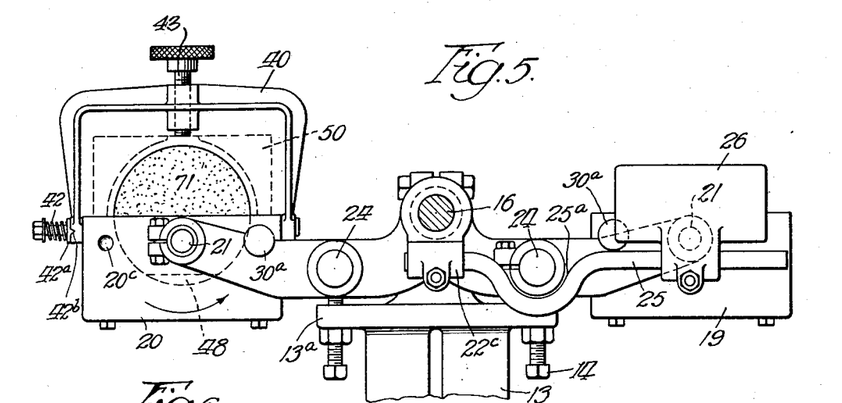
Fig. 5 is a view similar to Fig. 4 showing the boxes in supported position with the drier applied.

The core box 20 is provided with bails 40, one pivoted at each of its ends to the box as indicated at 40ª upon suitable trunnions. One of the trunnions 41 is extended beyond the end of the bail 40 and a spring 42 is mounted under compression on such extended trunnion. A washer 42ª is pressed against the end of the bail as indicated in Fig. 5, the washer being provided with a V-shaped lug 42ᵇ to engage either of a pair of recesses or notches in the end of the bail, this arrangement providing a yielding securing means to hold the bail in either upright or horizontal position. A lock screw 43 is threaded through the center of the bail 40, being provided with the knurled head 43ª for manual operation.

Due to the off-setting of one of the bars 25, the bail 40 adjacent thereto may be swung outwardly a sufficient distance, as will be apparent.

Figure 3:
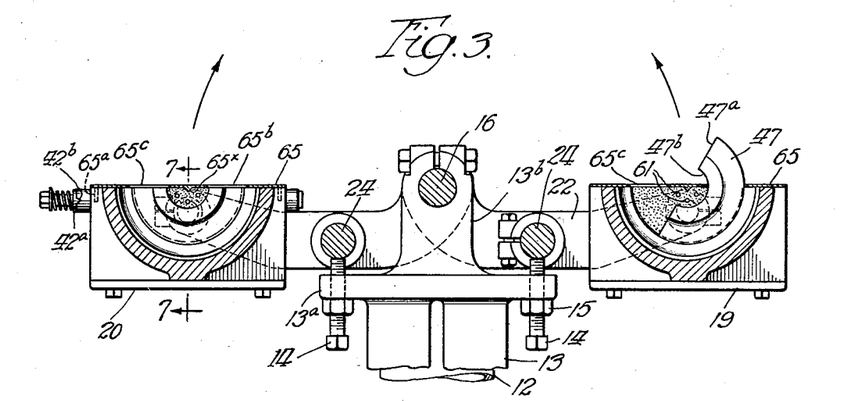
Fig. 3 is a vertical section along the line 3—3 of Fig. 2.

Each core box is provided with a pair of spaced grooves 45 in its inner wall. In each of such grooves is fixedly mounted an annular half-ring 46 (see Figs. 2 and 7) of relatively broad base and curvedly tapering to its inner side which is formed with a shoulder or tongue 46ª. A rotatable template member 47 is grooved in its periphery to engage with the tongue 46ª. This template member 47 is of semi-circular form, being slightly tapered from the end 47ª to the other end for draft. The member 47 will rotate upon the fixed portion 46 as indicated in Fig. 3. A V-shaped rib 48 extends partially across the bottom of the core box 20 to form a similar notch in the completed core for a purpose described hereinafter.

Figure 7:
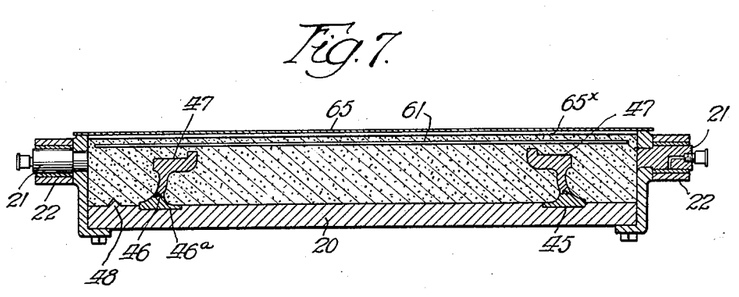
Fig. 7 is a vertical section through a half-core taken along the line 7—7 of Fig. 3.

The sectional contour of the template member is illustrated in Fig. 7. As shown in Fig. 3, the ring-like form of the template members provide recesses 47ᵇ for a purpose hereinafter described.

For support of and carrying the completed core, I provide a core holder or drier 50 of light metal or the like preferably of relatively high heat conductivity, this member being concaved to support and protect substantially half the periphery of the completed core.

A withdrawing table 57 is provided for support and removal of the completed core and its drier 50, this being supported from a casing or beam 55, having a split recessed end or clamping sleeve 55ª engaging the post 12 to which it may be clamped in suitable adjusted position. At its other end, the casing or beam 55 is vertically recessed to accommodate the reciprocating plunger 56, carrying the table 57 at its upper end. At its lower end the plunger 56 carries a collar 58, which will function as a stop member to limit the amount of reciprocation.

Journaled in the casing 55 is a pinion 59 in mesh with the rack portion 56ª of the plunger 56 as illustrated in dotted lines in Fig. 1. A chain 60 partially surrounds the pinion 59 meshing with the teeth thereof, being secured at its end 60ª to the pinion. Attached to the lower end of the chain 60 and extending downwardly therefrom is the rod 61 engaging the clevis 62. This clevis is pivoted to the operating lever 63 which in turn is fulcrumed at 64 to the bracket 64ª attached to and projecting outwardly from the socket 11 (see Fig. 1). The lever 63 is provided with a pedal or the like at its free end on which the operator may step to lift the table 57, as will be obvious.

In the practice of my process and in the operation of the apparatus described above, the core boxes 19 and 20 are arranged in the position shown in Fig. 2, with the template members 47 in position. A parting substance is sprinkled over the interior of the boxes to ensure non-sticking of the core mixture or the like. The mixture or composition of which the core is to be constructed is then charged in the boxes, it being possible for two operators to work simultaneously on the two sections. This mold composition is solidly tamped in conventional manner. Tying or reinforcing rods 61 or the like are imbedded in the upper portion of each core section, as illustrated in Figs. 3 and 7, the recesses 47ᵇ permitting their accommodation together with the core composition. After completion of the charging and tamping of each box, a stripper plate 65 is placed upon the open top of the box, being properly positioned by means of pins 65ª projecting into suitable holes in the boxes.

Each of these stripper plates is provided with a rib 65ˣ on its under surface, these ribs being so located as to create or form a longitudinal vent aperture in the central upper surface of the core section.

Figure 4:
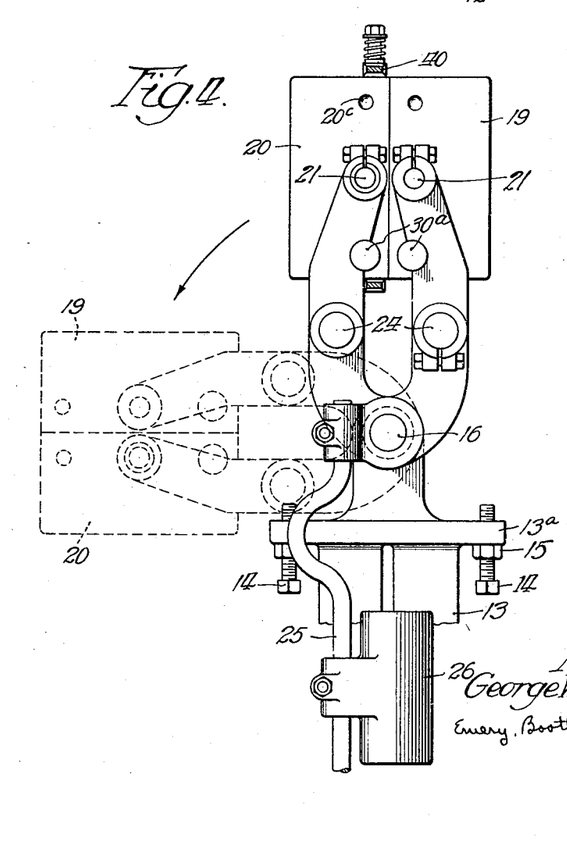
Fig. 4 is a side elevation of the mechanism showing the core boxes in central meeting position in full lines and swung in meeting position to one side in dotted lines.
Figure 6:
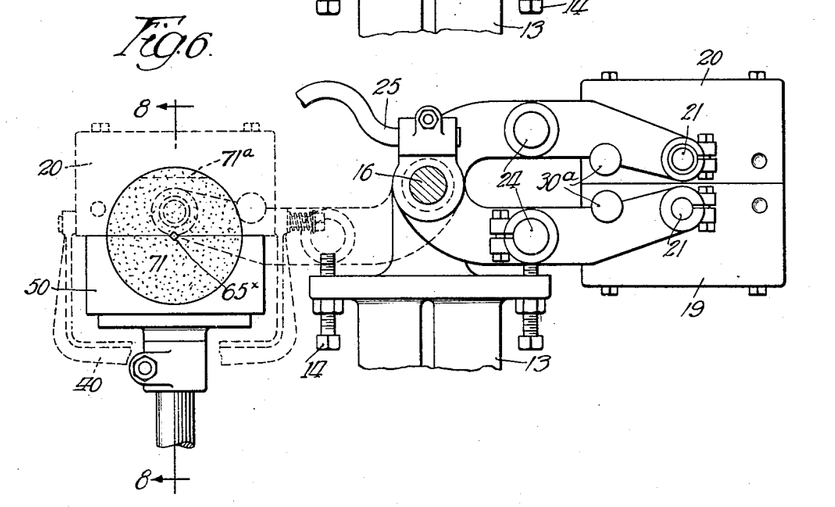
Fig. 6 is a view similar to Fig. 5 after deposit of the drier and core on the withdrawing table.

These stripper plates are provided with a pair of apertures in registration with the ends of the templates 47, one aperture 65ᵇ being of a contour conforming to the section of the template 47. The other aperture 65ᶜ of each pair is of lesser area so that the template may not pass therethrough. With this construction the operator must start the template out of the core section in such wise that the large end will pass out first, and the tapered construction of the template will ensure proper draft or passage of the template. After the core sections have been struck off or leveled and the stripper plates 65 positioned, the operators may tap or strike the ends 47ᵃ of the templates to bring them into proper position against the stripper plates. Thereafter by inserting a drift or tool through the apertures 65ᶜ the templates 47 may be rotated out through the apertures 65ᵇ, as indicated in Fig. 3, and removed from the boxes, after which the stripper plates 65 are removed and core paste or the like sprinkled over the tops of the core sections. I find that this paste may be applied in powdered form, and it will absorb enough moisture from the core mixture to form the proper adhesive which precludes the necessity of mixing a wet paste and applying it with a brush or otherwise. Thereafter each pair of arms 22 is swung upwardly about cross-shaft 16, the boxes being brought into contact with the meeting surfaces of the core sections substantially in a vertical plane. The two boxes having been brought into the position indicated in Fig. 4, the core paste will ensure ultimate adhesion of the core sections, and the two boxes are then swung together into the position indicated in dotted lines in Fig. 4. The upper box 19 is swung back to the position indicated in Fig. 5, and the core drier or holder 50 is substituted as indicated in Fig. 5. The bails 40 are then swung up over the drier 50, and the same is clamped to the lower core box 20 by the screws 43. The detent 30ᵃ is withdrawn and the box 20 and drier are inverted into the position shown in Fig. 6 (the core box there being indicated in dotted lines).

The operator depresses his end of the lever 63 which acts through the chain 60, pinion 59 and rack 56 to raise the table 57 to contact with the core drier 50. After the table 57 is in contact with and supporting the core holder or drier 50, the bails 40 should be released and swung to one side to free said holder from the box 20. The table 57 may then be gently lowered and the operator can remove the core drier and completed core to the drying or baking stand for final treatment. The box 20 may then be reinverted or turned right side up and with its arms may be then swung back to the full line position indicated in Fig. 6, the bails 40 having been released and swung to one side.

I obtain very satisfactory results by allowing the cores to stand in the driers in the open air for a period of time, as for example, twenty to thirty minutes, during which the outer portion is partially air-dried to form a shell which is relatively harder than the interior of the core. After the formation of this outer shell by air drying, the drier and core are moved into a baking oven or the like for the baking operation which completes the drying and baking of the core. Due to the harder shell formed by air drying, any stresses resulting from the baking of the inner portion of the core will be resisted and a more accurate and true core will result than where the core is immediately transferred to the oven from the molding operation.

By construction of the core in the manner described I am enabled to produce a core especially desirable for the casting of hollow rollers or rolls, in which an accurate cylindrical surface will be obtained, especially suitable for the construction of balanced rolls. I am also enabled to produce a core of this character in which adequate support will be provided for the core during the casting operation and which will be of sufficient strength and rigidity to resist destruction during casting. I am also enabled to produce a core which will permit the production of a cast roll or roller having concaved or recessed ends, especially desirable in certain cases.

Figure 8:
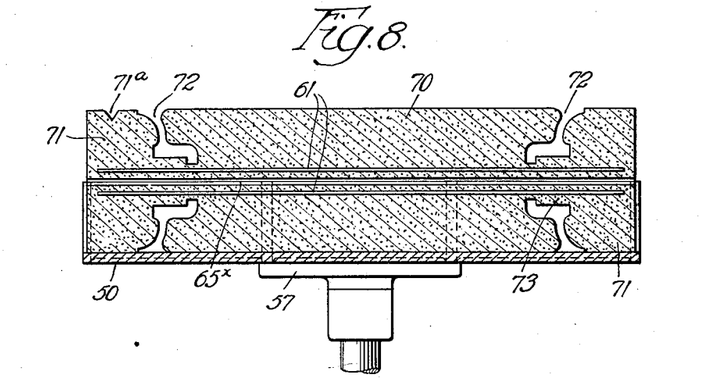
Fig. 8 is a vertical section through the completed core taken along the line 8—8 of Fig. 6.
Figure 9:
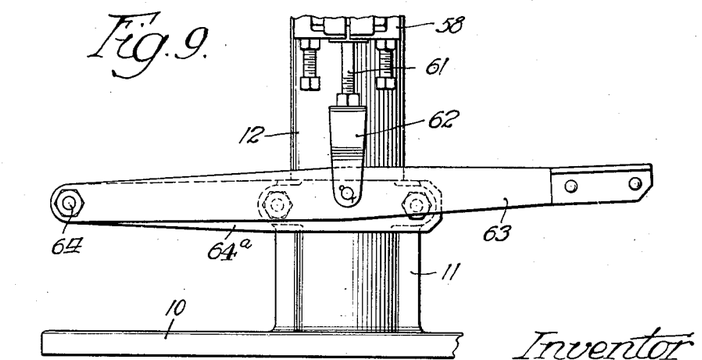
Fig. 9 is a side elevation of the withdrawing mechanism.

In Fig. 8, I have illustrated in section a completed core which it will be apparent consists of a central cylindrical body portion 70 with spaced end portions 71, these being partially spaced by the recesses 72 and connected by the central hub portion 73. The extended end portions 71 in coaction with the mold in which the core is used, provide a large, desirable support for the body portion of the core, which is spaced from the surrounding mold, and permit the accurate registry or positioning of the core in the mold.

The hub sections accommodate the tying or reinforcing rods 61, which further strengthens the core construction. This construction also permits the carrying of the recesses 72 under the ends of the body portion 70 a substantial distance, as indicated in Fig. 8, which is especially desirable with the core or roll which I desire to cast. The rib 48 of the core box 20 forms a notch 71ᵃ in one end of the core with which coacts a lug or positioning means in the mold to accurately and properly position the core in the mold for casting.

It will be apparent that the core shown in

Fig. 8 is adapted for use with a surrounding mold for casting a hollow roll with dished or recessed heads, and in this instance with dished heads having inwardly extending hubs. The integral extensions of the core, by which it may be supported in the surrounding mold, are joined to the main body portion of the core by the hub coring portions 73. Said extensions provide mold faces in fixed spaced relation to the ends of said main body for exteriorly molding the ends of the roll casting. The spaces separating the main body from the extensions are of the cross-sectional configuration of the said dished or recessed mold heads. These spaces are formed by partitions in the core boxes composed of the rotatable templates 47 and the ribs 45 providing the seats on which the templates are mounted. The cross sectional shape of these partitions is the same as that of the spaces already referred to. On account of the complex shape of the heads of the roll to be cast, the partitions and the spaces in the core are of correspondingly complex shape, and in this connection it will be observed that the templates 47 present molding faces which are otherwise than at right angles to the core axis, portions of said faces relatively nearer the axis extending laterally beyond other portions which are relatively farther from the axis. In this particular instance the templates are of angular cross section, to provide molding spaces for the webs of the roll heads and molding spaces for the inwardly extending hubs of the roll heads. Such complexity of shape would ordinarily prevent separation of the core from the boxes or from the partitions, but in this instance the templates may be easily removed by rotation about the core axis as hitherto explained, thus permitting the core to be withdrawn from the box and separated from its partitions which mold the spaces between its main body and the end extension.

It will be understood that the invention is not limited to the particular embodiment thereof herein shown and described, since the details of the construction, arrangement and mode of operation may be modified to suit different requirements and conditions; moreover that it is not essential that all features of the invention be used conjointly, since they may be advantageously used in various different combinations and sub-combinations.

The process herein described is the subject-matter of an application filed by me as a division of this application, filed April 26, 1928, Serial No. 273,037; and the core herein described is the subject-matter of an application filed by me as a division of this application, filed April 26, 1928, Serial No. 273,036.

What I claim is:

1. In apparatus of the class described, a pair of boxes, and arms pivotally attached to said boxes and rotatable about a common axis.

2. In apparatus of the class described, a pair of boxes, arms pivotally attached to said boxes and rotatable about a common axis, and means to lock said boxes in adjusted position with respect to said arms.

3. In apparatus of the class described, a pair of boxes, and arms pivotally attached to said boxes and rotatable about a common axis, one of said boxes being provided with means to secure a core drier thereto.

4. In apparatus of the class described, a pair of boxes, and arms pivotally attached to said boxes and rotatable about a common axis, one of said boxes being provided with means to secure a core drier thereto, the last named means comprising a pivoted bail.

5. In apparatus of the class described, a pair of boxes, arms pivotally attached thereto, the arms being mounted to rotate about a common axis, and counterbalancing means attached to said arms.

6. In apparatus of the class described, a pair of boxes, arms carrying the same, said arms being mounted to swing about a common axis, said boxes being pivotally mounted in said arms, and detents coacting with said boxes to lock the same in adjusted pivoted position with respect to said arms.

7. In apparatus of the class described, a pair of boxes, arms carrying the same, said arms being mounted to swing about a common axis, said boxes being pivotally mounted in said arms, and detents coacting with said boxes to lock the same in adjusted pivoted position with respect to said arms, the last named means comprising spring urged detents.

8. In apparatus of the class described, a pair of boxes, each of said boxes being provided with a pair of spaced swinging arms and being pivotally mounted between said arms, and a shaft extending between and securing the arms of each pair against relative movement.

9. In apparatus of the class described, a pair of boxes, each of said boxes being provided with a pair of spaced swinging arms and being pivotally mounted between said arms, and a shaft extending between and securing the arms of each pair against relative movement, the arms of each pair being adjustable on said shaft to accommodate boxes of different lengths.

10. In apparatus of the class described, a pair of boxes, each of said boxes being provided with a pair of spaced swinging arms and being pivotally mounted between said arms, a shaft extending between and locking the arms of each pair against relative movement, and spring detents carried by one of each pair of said arms and engageable with the boxes to lock the same in adjusted pivoted position with respect to said arms.

11. In apparatus of the class described, a pair of boxes, each of said boxes being provided with a pair of spaced swinging arms and being pivotally mounted between said arms, and a shaft extending between and securing the arms of each pair against relative movement, said pairs of arms being rotatably mounted upon a common shaft for concentric rotation.

12. In apparatus of the class described, a pair of boxes, each of said boxes being provided with a pair of spaced swinging arms and being pivotally mounted between said arms, and a shaft extending between and securing the arms of each pair against relative movement, said pairs of arms being rotatably mounted upon a common shaft for concentric rotation, said pairs of arms being adjustable with respect to said last named shaft.

13. In apparatus of the class described, supporting means comprising a head and table portion, swinging arms rotatably mounted with respect to said head, boxes carried by said arms, and supporting screws extending through said table to support said arms in charging position.

14. In apparatus of the class described, withdrawing means comprising a table, a plunger, said plunger being provided with a rack portion, a rotatable pinion meshing with said rack, a chain meshing with said pinion, and means to actuate said chain to raise said plunger and table.

15. In apparatus of the class described, supporting means, a casing projecting therefrom, a pinion journaled in said casing, an actuating chain meshing with said pinion, and a plunger reciprocably mounted in said casing and provided with a rack portion meshing with said pinion.

16. In apparatus of the class described, an open box, a segmental template member rotatably mounted therein, a stripper plate attachable to said box over said template and provided with a pair of apertures one over each end of said template, one of said apertures being constructed to conform to the sectional contour of said template, the other of said apertures being so constructed as to prevent passage therethrough of said template.

17. In apparatus of the class described, an open box, a segmental template member tapered from one end to the other rotatably mounted therein, a stripper plate attachable to said box over said template and provided with an aperture substantially conforming to the cross-sectional contour of said template, said aperture being alignable with the larger end of said template to permit movement of said template out of said box through said stripper plate.

18. In apparatus of the class described, an open box, said box being provided with a rotatable template member, and a stripper plate engageable with said box to overlie said template member, said stripper plate being apertured to permit rotatable ejection of said template from said box, said stripper plate being further provided with a longitudinal rib on its under surface to form a vent passage in the core formed in said box.

19. In apparatus of the class described, a box having an inwardly projecting segmental annular rib, and a template member engageable with said rib and rotatable thereon.

20. In apparatus of the class described, a box having an inwardly projecting segmental annular rib, and a template member engageable with said rib and rotatable thereon, said rib and template being provided with an interengaging tongue and groove.

21. In apparatus of the class described, a box, a segmental template rotatably mounted in said box, said template being provided with a central recess in its upper portion.

22. In apparatus of the class described, a box, a segmental template rotatably mounted in said box, said template being tapered from one end to the other to facilitate withdrawal from the core by rotating the template in the direction toward its wider end.

23. A core making apparatus embodying complemental boxes for molding core sections and cooperative to join the sections, said boxes embodying means including segmental templates by which the core sections are formed with extensions partially spaced from the main body of the core and joined thereto by hub portions, said templates being of cross-sectional forms corresponding to the configuration of disked or recessed roll heads and being removable by rotation about the core axes.

24. A core making apparatus embodying complemental boxes for molding core sections and cooperative to join the sections, said boxes embodying means including rotatable segmental templates by which the core sections are formed with extensions partially spaced from the main body of the core and joined thereto by hub portions, said templates being of angular cross-sectional form so as to provide segmental ring-like portions with lateral flanges at their inner peripheries and being arranged with said flanges disposed toward one another.

25. A core making apparatus embodying a pair of complemental core boxes and movable supports therefor organized and arranged for bringing the boxes into cooperative relationship with their confronting faces vertically disposed and for holding the boxes in said relationship while disposing them in a position in which one box faces up and the other superposed thereon faces down, the said superposed box being displaceable to leave the core in the lower box, and said lower box invertibly mounted in its supporting means to permit inversion thereof to allow withdrawing the core in a holder which may first be applied on said box before it is inverted.

26. A core making apparatus embodying a pair of complemental core boxes and swinging supports therefor by which the boxes may be brought from charging position into cooperative relationship and swung in such relationship to position for supporting the core in one box while allowing the other box to be removed, said first mentioned box being invertibly mounted in its support to permit depositing the core in a holder which may first be applied on said box before inverting it.

27. A core making apparatus embodying a pair of complemental core boxes and swinging supports therefor by which the boxes may be brought from charging position into cooperative relationship and swung in such relationship to position for supporting the core in one box while allowing the other box to be removed, said first mentioned box being invertibly mounted in its support to permit depositing the core in a holder which may first be applied on said box before inverting it and being provided with swinging clamping devices for clamping said holder in place.

28. A core making apparatus embodying a pair of complemental core boxes swingingly connected to allow bringing the boxes face to face in a vertical position and holding them in such relationship while swinging them to a horizontal position and then reversely swinging the superposed box to leave the core in the lower box, said lower box provided with swinging bails having clamping screws, which bails are adapted to be swung over a cooperating core holder and said screws adapted to clamp said holder to the lower box.

29. A core making apparatus embodying a pair of complemental core boxes and swinging supports therefor by which the boxes may be brought from charging position into cooperative relationship and swung in such relationship to position for supporting the core in one box while allowing the other box to be removed, said first mentioned box being invertibly mounted in its support to permit depositing the core in a holder which may first be applied on said box before inverting it, means for releasably securing said holder and box on which it is applied in cooperative relationship, and a withdrawing table and means for elevating it into position to contact with and support said holder after the inversion of the box connected therewith and for lowering it to withdraw the holder and core therein.

30. A core making apparatus embodying a pair of complemental core boxes and swinging supports therefor by which the boxes may be brought from charging position into cooperative relationship and swung in such relationship to position for supporting the core in one box while allowing the other box to be removed, said first mentioned box being invertibly mounted in its support to permit depositing the core in a holder which may first be applied on said box before inverting it, and means for releasably securing such holder and box on which it is applied in cooperative relationship.

31. A core making apparatus embodying complemental boxes for molding the longitudinal half parts of the core, said boxes having symmetrically-arranged transversely-disposed segmental templates removable from their respective boxes by rotation about the core axis, said templates providing molding faces of which portions nearer the core axis extend laterally beyond other portions farther from the core axis.

32. A core box having transversely-disposed semicircular templates therein spaced from the ends of the box, said templates providing molding faces portions of which nearer the core axis extend laterally beyond other portions farther from the core axis and being rotatable about the core axis for removing the templates.

33. A core box having symmetrically-arranged transversely-disposed semicircular templates therein spaced from the box ends, said templates having cross-sectional forms corresponding to the cross-sectional forms of the central portions of dished or recess roll heads and being rotatably mounted to permit removal of the templates by rotation about the core axis.

34. A core box having symmetrically-arranged transversely-disposed semicircular templates therein spaced from the box ends, said templates having cross-sectional forms corresponding to the cross-sectional forms of the central parts of roll heads and inwardly extending hubs, and being rotatably mounted to permit removal of the templates by rotation about the core axis.

35. A core box having transverse partitions spaced from the ends thereof, said partitions being of the cross sectional form of roll heads having inwardly extending hubs and embodying segmental templates and seats therefor on which the templates are mounted to permit rotation of the templates about the core axis.

In testimony whereof, I have signed my name to this specification.

GEORGE W. GILDERMAN.